(12) United States Patent
Rauch

(10) Patent No.: US 10,788,206 B2
(45) Date of Patent: Sep. 29, 2020

(54) ROTARY BATCH DECOATER

(71) Applicant: Novelis Inc., Atlanta, GA (US)

(72) Inventor: Edwin L. Rauch, Fulton, NY (US)

(73) Assignee: Novelis Inc., Atlanta, GA (US)

( * ) Notice: Subject to any disclaimer, the term of this patent is extended or adjusted under 35 U.S.C. 154(b) by 199 days.

(21) Appl. No.: 15/758,116

(22) PCT Filed: Sep. 18, 2015

(86) PCT No.: PCT/US2015/050971
§ 371 (c)(1),
(2) Date: Mar. 7, 2018

(87) PCT Pub. No.: WO2017/048281
PCT Pub. Date: Mar. 23, 2017

(65) Prior Publication Data
US 2018/0245790 A1   Aug. 30, 2018

(51) Int. Cl.
F23G 5/50      (2006.01)
F23G 7/06      (2006.01)
C22B 7/00      (2006.01)
F23G 5/027     (2006.01)
F23G 5/12      (2006.01)

(52) U.S. Cl.
CPC ............. *F23G 5/50* (2013.01); *C22B 7/001* (2013.01); *F23G 5/0273* (2013.01); *F23G 5/12* (2013.01); *F23G 7/065* (2013.01); *F23G 2207/40* (2013.01); *Y02P 10/214* (2015.11)

(58) Field of Classification Search
CPC . F23G 5/50; F23G 5/12; F23G 5/0273; F23G 7/065; C22B 7/001
See application file for complete search history.

(56) References Cited

U.S. PATENT DOCUMENTS 4,101,264 A   7/1978  Barr et al.

FOREIGN PATENT DOCUMENTS

| DE | 2651385 | 5/1977 | |
|---|---|---|---|
| DE | 2832414 B1 | 1/1980 | |
| DE | 216520 A1 | 12/1984 | |
| DE | 10348987 A1 | 5/2005 | |
| GB | 2470127 | 11/2010 | |
| GB | 2510642 | 8/2014 | |
| WO | WO-2014170647 A1 * | 10/2014 | ............... F23G 7/10 |

OTHER PUBLICATIONS

International Application No. PCT/US2015/050971, International Search Report and Written Opinion, dated May 23, 2016, 10 pages.
PCT/US2015/050971, International Preliminary Report on Patentability, dated Mar. 29, 2018, 9 pages.
German Patent Application No. 112015006914.3 , Office Action dated May 6, 2020, 18 pages.

* cited by examiner

*Primary Examiner* — Tima M. McGuthry-Banks
(74) *Attorney, Agent, or Firm* — Kilpatrick Townsend & Stockton LLP

(57) ABSTRACT

Systems and methods for efficiently performing rotary batch decoating can use time-offset batch reactors. A first batch reactor can operate out of phase with a second batch reactor, so that the burning of pyrolysis gases from the first reactor can be used to provide fuel to the incinerator used to heat the material in the second reactor. After the first reactor is dumped and filled with new material, the pyrolysis gases from the second reactor can be used to provide fuel to the incinerator, which heats the material in the first reactor.

18 Claims, 6 Drawing Sheets

US 10,788,206 B2

ROTARY BATCH DECOATER

TECHNICAL FIELD

The present disclosure relates to metal recycling generally and more specifically to decoating metal during recycling.

BACKGROUND

During metal recycling, such as recycling aluminum (including aluminum alloys), moisture, pieces of combustible organic residue, organic coatings, such as oils, paints, lacquers, and the like must be removed. Metal scrap can be crushed, shredded, or chopped into smaller pieces. The smaller pieces are then decoated, melted, and recovered.

Decoating is an important step that prevents violent gas evolution during melting. Decoating involves heating the scrap metal to a point where moisture and organic material (e.g., paints, lacquers, glues, and others) are removed from the scrap, but not heating the scrap to the extent that the metal oxidizes. Decoating may be performed in batches or continuously. Batch decoating involves the use of a decoating chamber (e.g., rotary drum) into which scrap is placed. Heated gas is circulated through the decoating chamber. The heated gas must be at a sufficient temperature (e.g., the pyrolysis range) in order to decoat the scrap. Heated gas is provided by burning purchased fuel or other materials (e.g., coal, natural gas, or others) (hereinafter collectively referred to as "purchased fuel") in an incinerator. The scrap can be tumbled in the decoating chamber while the heated gas is circulated through. As organics are released, the reaction itself can provide heat to the reactor. The level of oxygen and/or temperature may be reduced to slow the release of volatile organic compounds (VOCs) and pyrolysis gases (hereinafter collectively referred to as "pyrolysis gases") when the incinerator temperature reaches a set-point. After sufficient time has passed, the decoated scrap can be removed from the decoating chamber.

Batch decoating can be easily sped up or slowed down, for example by changing how long the scrap remains in the decoating chambers before being removed. When the organic levels of the scrap are very high, the scrap can be decoated for longer periods of time. The degree of decoating at the time of discharging the scrap from a decoating chamber may be varied, depending on numerous factors such as the alloy being processed, the composition of the organic contamination, or the needs of a downstream process.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
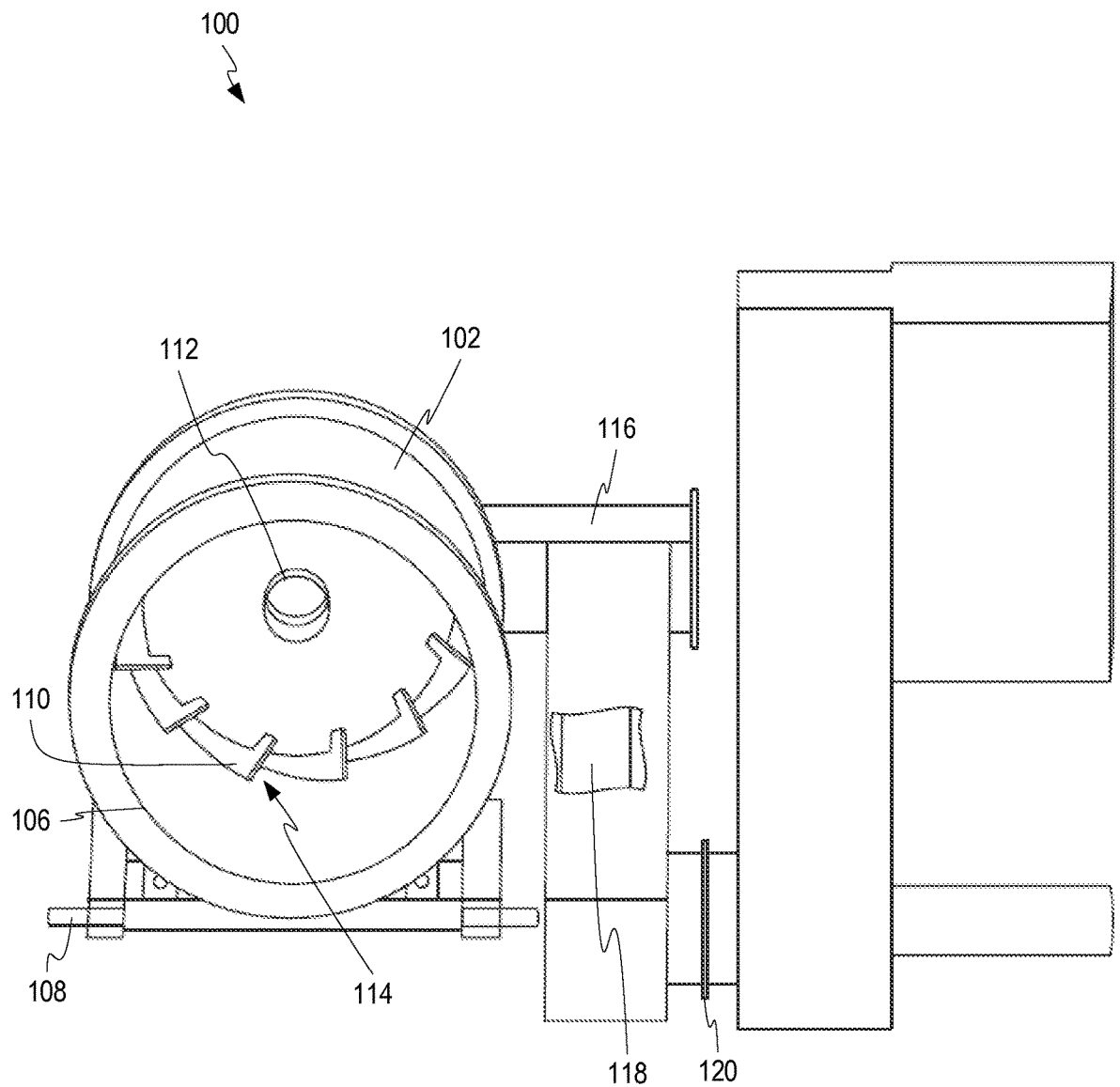
FIG. 1 is a depiction of a rotary drum batch reactor according to aspects of the present disclosure.

Certain aspects and features of the present disclosure relate to systems and methods for efficiently performing rotary batch decoating using time-offset batch reactors. A first batch reactor can operate out of phase with a second batch reactor so that the combustion of pyrolysis gases from the first reactor can be used to provide fuel to the incinerator used to heat the scrap in the second reactor. After the first reactor is dumped and filled with new scrap, the pyrolysis gases from the second reactor can be used to provide fuel to the incinerator, which heats the scrap in the first reactor. Using time-offset reactors can allow batch decoating to be performed without using as much purchased fuel, relying on the pyrolysis gases released from an out-of-phase reactor to provide fuel to the incinerator.

A batch decoater using time-offset batch reactors can include at least two batch reactors. Organic vapors (e.g., VOCs or pyrolysis gases) are liberated as the material (e.g., scrap metal) is heated. The vapors act as a source of heat energy for the decoating process. During an initial heating phase in a first reactor, moisture is liberated and the scrap absorbs heat, but exothermic reactions do not take place. At this time, an out-of-phase second reactor is liberating organic vapors (e.g., VOCs or pyrolysis gases) that are both generating heat within the second reactor, but also supplying much of the fuel required to maintain proper incineration temperature in the system incinerator. The dilution from the first reactor (e.g., the reactor in the initial heating phase) absorbs heat and minimizes the potential for the system to over-heat. Similarly, as the second reactor approaches completion of the decoating cycle, where very little VOCs or pyrolysis gas are being liberated but the first reactor is now in the active organic vapor release mode, the dilution from the second reactor absorbs heat and minimizes the potential for an over-heat. The system is effectively fueled to a large extent from the organic content of the scrap, while minimizing overheating of the system.

The system can also include one or more circulation fans, an incinerator, a supply of combustion air, a supply of oxygen, a heat exchanger, and other elements used in kiln decoating systems.

Use of the system and method described herein can allow for decoating of materials having a larger percentage of organic material by weight, such as above approximately 6%. In some cases, the percentage of organic material by weight may be above approximately 6% and up to approximately 20%, although material with more than approximately 20% organic material by weight may also be decoated and this range is not intended to be limiting.

Generation of pyrolysis gas within a reactor tends to spike at a certain point during decoating, which can be referred to as the pyrolysis spike point. In some cases, more than two reaction chambers are used, with each reaction chamber operating out of phase with at least one other reaction chamber. In some cases, each reaction chamber can operate out of phase with respect to each other reaction chamber. By operating each reaction chamber out of phase, the pyrolysis spike points of the various reaction chambers can be spread out, resulting in a more even and continuous flow of pyrolysis gas into the incinerator.

In some cases, the atmospheres of each reactor of the system can be individually controlled (e.g., through the use of sensors, fans, valves, and other equipment). The internal atmosphere of each reactor can be controlled to decoat specific batches of scrap based on the needs of that particular batch of scrap at that particular time. Therefore, the system can be running as described herein, using two or more reactors for decoating while taking advantage of generated pyrolysis gases, however the atmosphere in each reactor can be controlled to best decoat the scrap within each respective reactor. In an example, a first batch of scrap may be subjected to a cooler decoating atmosphere in a first reactor (e.g., because the scrap is thin, such as aluminum foil or gum wrapper) while a second batch of scrap may be subjected to a warmer decoating atmosphere in a second reactor (e.g., because the scrap is thicker, such as beverage cans). Different batches of scrap can use different decoating atmospheres due to various reasons, including but not limited to thickness of scrap and type of organics being decoated.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may be drawn not to scale.

FIG. 1 is a depiction of a rotary drum batch reactor 100 according to aspects of the present disclosure. A decoating system as described herein can use a pair of rotary drum batch reactors 100, as described in further detail below. The rotary drum batch reactor 100 can include a drum 102 having a charging port 106 into which materials can be introduced into the reactor 100. Scrap can be charged into the rotary drum batch reactor 100 with the rotational axis of the drum 102 in the horizontal or slightly inclined position. The drum 102 can be coupled to a tilting frame 108 allowing the rotational axis of the drum 102 to be tilted.

A door (not shown) can be pressed and sealed against the charging port 106 and controlled oxygen hot air mixed with products of combustion can be introduced into the reactor 100. The door can either rotate with the drum 102 or seal against the drum face using a sliding rotary seal. The drum 102 is maintained at a slight under-pressure to avoid escape of fumes from the system. The door can be attached by a swing arm to the same tilting frame 108 from which the rotary drum 102 is supported so that the seal is maintained regardless of the tilt angle of the drum 102.

Heated gas can enter the reactor 100 through a gas supply distributor 114 and leave the reactor 100 through a gas exhaust port 112. The gas supply distributor 114 can be coupled to the supply duct 116. The gas supply distributor 114 can allow heated gas to enter the drum 102 at a point behind one or more mixing features 110. The gas supply distributor 114 can be positioned elsewhere, such as on the rear of the drum 102 (e.g., an end opposite the door) or the door of drum 102. The supply and exhaust can be coupled to the reactor through a coaxial slip ring at the end opposite the door. The supply and exhaust ducts can also pass through the tilt axis by a coaxial slip ring 120.

In some cases, the supply enters the reactor at the opposite end from the door and is sealed to the reactor by a sliding rotary seal. The exhaust can leave through a port in the door. Where practical, the exhaust duct 118 can be run within the supply duct 116 to help prevent condensation of lacquers in the exhaust and to eliminate the need to insulate the exhaust duct 118. At least a portion of the supply duct 116 can be coaxial with at least a portion of the exhaust duct 118. At least a portion of the supply duct 116 can surround the exhaust duct 118. The reactor can be equipped with mixing features 110 (e.g., lifters) to assure that all material is rolled and all surfaces are exposed to hot gases. When a batch has completed, a collection bin can be positioned beneath the door area of the drum 102, the door can be opened, the drum 102 can be inclined toward the door and then rotated. The batch will rapidly discharge into the collection bin for transport to a furnace for melting. The degree of decoating at the time of discharging the scrap may be varied, depending on numerous factors such as the alloy being processed, the composition of the organic contamination (e.g., composition of organic contamination), or the needs of a downstream process. A determination of a suitable time to discharge the scrap can be made based on measurements of the contents of a drum 102, measurements of temperature within the drum 102, measurements of the contents of gas exiting the drum 102 (e.g., within or through the exhaust duct 118), or measurements of temperature of gas exiting the drum 102 (e.g., within or through the exhaust duct 118). Other types of drum batch reactors can be used with the decoating system described herein.

Figure 2:
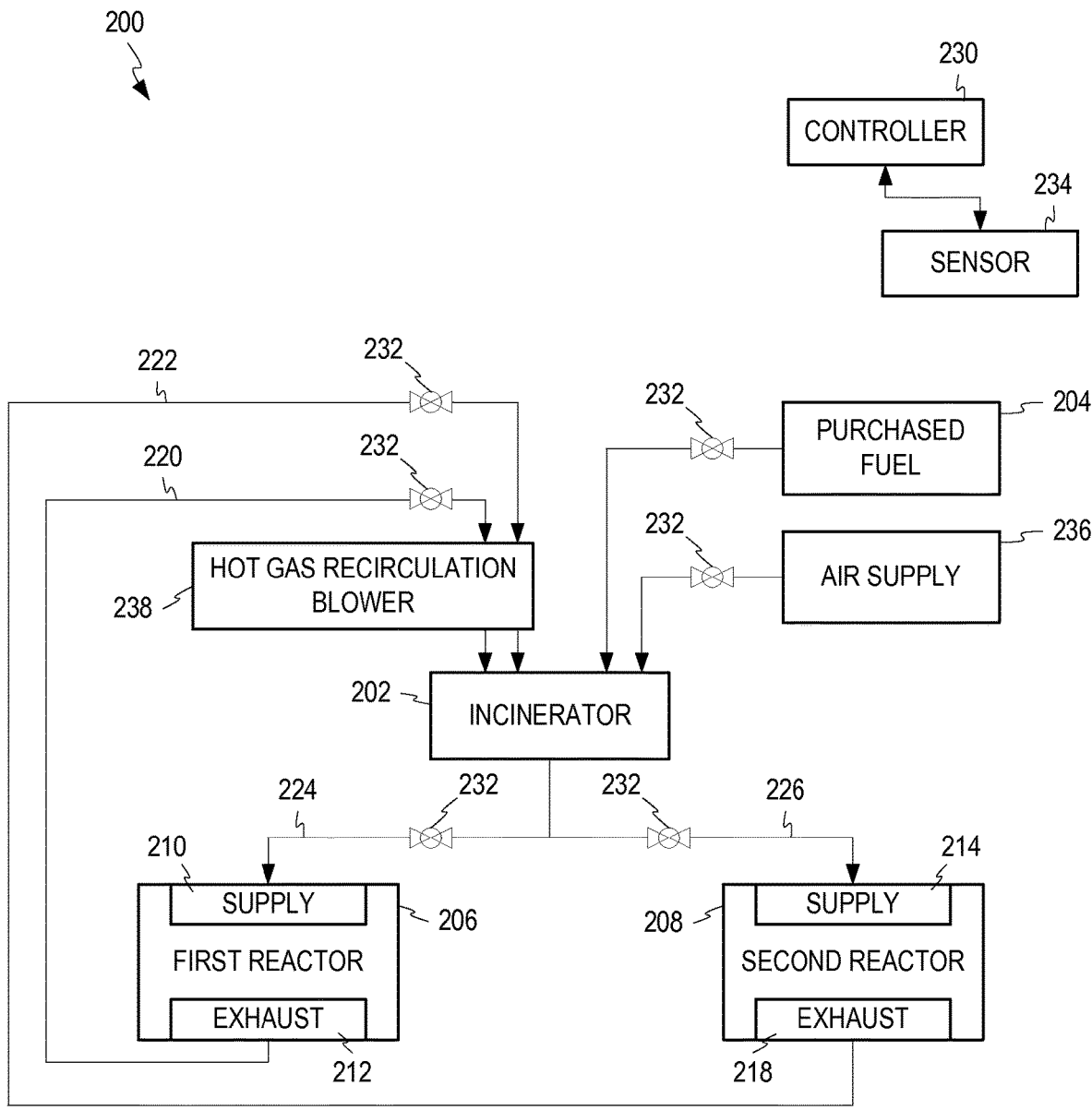
FIG. 2 is a schematic diagram depicting a decoating system according to aspects of the present disclosure.

FIG. 2 is a schematic diagram depicting a decoating system 200 according to aspects of the present disclosure. The decoating system 200 includes an incinerator 202 coupled to a first reactor 206 and a second reactor 208. Purchased fuel 204 (e.g., from a fuel source) feeds into the incinerator 202 and can be used to provide heated gas to the first reactor 206 and the second reactor 208. The incinerator 202 is coupled to a supply port 210 of the first reactor 206 through a first supply duct 224. The incinerator 202 is coupled to a supply port 214 of the second reactor 208 through a second supply duct 226. The first reactor 206 and second reactor 208 both can be rotary drum reactors, such as a rotary drum reactor as described above, or other reactors can be used. The exhaust port 212 of the first reactor 206 is coupled to the incinerator 202 through a first circulation line 220. The exhaust port 218 of the second reactor 208 is coupled to the incinerator 202 through a second circulation line 222. The incinerator 202 is provided with air or another oxidant from an air supply 236, controlled to match the input of both or either of the purchased fuel 204 and pyrolysis gas.

In use, the incinerator 202 can burn purchased fuel 204 to provide heated gas to the first reactor 206 to heat up the material (e.g., scrap metal) inside the first reactor 206. After reaching an activation temperature, the organic residue coating the material can begin to vaporize or burn off, resulting in the generation of pyrolysis gases. The pyrolysis gases in the first reactor 206 can be passed through the first circulation line 220 and back into the incinerator 202 to be combusted. In some cases, one or more traps or filters can be placed inline between reactors 206, 208 and the incinerator 202 to remove solids or particulates from the pyrolysis gases. A hot gas recirculation blower 238 provides the necessary motive force to circulate the gases from the reactors 206, 208 to the incinerator 208 and back again. The pyrolysis gases combusted in the incinerator 202 provide additional heated gas to the first reactor 206 and also the second reactor 208. By running the first reactor 206 and second reactor 208 out of phase from one another, as described in further detail below, the incinerator 202 can heat up the material in the second reactor 208 using solely or mostly the pyrolysis gases generated in the first reactor 206, rather than using more purchased fuel 204.

In some cases, more than two reactors can be used, with the incinerator 202 supplying heated gas to the supply ports of additional reactors and with the exhaust ports of the additional reactors circulating the pyrolysis gases back to the incinerator 202. Additional reactors can be used in phase with the first reactor 206 or second reactor 208, or out of phase of both the first reactor 206 and second reactor 208.

In some cases, flow control devices 232 (e.g., valves) and at least one controller 230 can be used to automatically open and close the various gas and fuel paths as necessary to redirect fuel, heated gas, and pyrolysis gas as necessary. In some cases, the decoating system 200 only includes flow control devices 232 between the incinerator 202 and the supply ports (e.g., supply port 210 and supply port 214), as well as a flow control device 232 between the purchased fuel 204 and the incinerator 202. The controller 230 can open and close one or more of flow control devices 232 to control when the decoating process starts in each of the first reactor 206 and second reactor 208. By opening a flow control device between the incinerator 202 and a reactor, the controller 230 can allow heated gas to enter that reactor, thus allowing the decoating process to begin in that reactor. The controller 230 can time-offset the decoating processes of the reactors by actuating one or more flow control devices to allow heated gas to enter a second reactor 208 only after previously actuating one or more flow control devices to allow heated gas to enter the first reactor 206.

The controller 230 can be coupled to one or more sensors 234; thus it is not intended that the decoating system 200 be limited to one sensor 234 as shown in FIG. 2. Each sensor 234 can be capable of detecting various conditions, such as the level of particulate (e.g., smoke), oxygen, combustibles, and temperature. Each sensor 234 can be located in or near any part of the decoating system 200 to measure conditions of that part. For example, sensors 234 can be located in the first reactor 206, in the second reactor 208, in the incinerator 202, in the first circulation line 220, in the second circulation line 222, elsewhere, or any combination thereof. Measurements taken by the one or more sensors 234 can be fed to the controller 230 to determine when decoating is completed, when pyrolysis begins, or other important periods or conditions of the decoating process. The sensors 234 can individually determine when pyrolysis begins in each of the reactors. Using measurements from the sensors 234, the controller 230 can cause the decoating process to begin in the second reactor 208 only after sufficient pyrolysis gases have been generated in the first reactor 206 to sufficiently feed the incinerator 202. Additionally, the controller 230 will modulate and can close a flow control device 232 between the purchased fuel 204 and the incinerator 202 after sufficient pyrolysis gases have been generated in the first reactor 206 to sufficiently feed the incinerator 202. The controller 230 can control any number of reactors.

In some cases, controller 230 can be used to control the decoating atmosphere within one or more reactor (e.g., first reactor 206 and second reactor 208). Controller 230 can be coupled to sensors 234 that measure, directly or indirectly, the decoating atmosphere within reactors 206, 208. Controller 230 can supply control signals to any suitable equipment in the system 200, including valves 232, incinerator 202, hot gas recirculation blower 238, air supply 236, reactors 206, 208, or any other suitable piece of equipment, including equipment not shown (e.g., other valves, ducting, or fans), to individually control the decoating atmosphere within each reactor 206, 208. The controller 230 can maintain a first desired atmosphere in the first reactor 206 while maintaining a second desired atmosphere in the second reactor 208. The first desired atmosphere can be different from the second desired atmosphere in any applicable way, including temperature, air flow rate, reactor rotation speed, oxygen content, or other factors. The first desired atmosphere can be tailored to best decoat a first batch of scrap in the first reactor 206 and the second desired atmosphere can be tailored to best decoat a second batch of scrap in the second reactor 208. The desired atmosphere can be selected for any suitable reasons, including but not limited to being selected to decoat specific species of organics (e.g., non-fragile versus fragile organics) and being selected to decoat certain types of base material (e.g., thin aluminum, such as foils, versus thicker aluminum, such as beverage cans). These aspects can be applied to systems with more than two reactors.

In some cases, multiple (e.g., sequential) stages of decoating can occur in multiple reactors of a single decoating system 200, with each reactor's internal atmosphere being tailored to a particular stage of decoating. For example, a first desired atmosphere can be maintained (e.g., during its decoating period) in the first reactor 206 while a second desired atmosphere can be maintained (e.g., during its decoating period) in the second reactor 208. The first desired atmosphere can be selected to handle a first stage of decoating and the second desired atmosphere can be selected to handle a second stage of decoating. Scrap can be initially processed in the first reactor 206. After the scrap from the first reactor 206 has finished, it can be stored (e.g., while another batch of scrap is being decoated in the second reactor 208) and subsequently processed in the second reactor 208 at a later time (e.g., in the next full loading-decoating-unloading cycle of the second reactor 208).

In some cases, a heat exchanger can be coupled to the incinerator 202 or to other components of the system 200. Excess heat may be removed from the incinerator 202 via the heat exchanger. The heat exchanger can directly convert the excess heat into mechanical energy (e.g., via a sterling cycle, rankine cycle, or other heat engine), electrical energy (e.g., thermoelectric elements), or chemical energy (e.g., an endothermic chemical reaction). In some cases, the heat exchanger can be coupled to a power generating device that can produce power for use in the system 200, for storage, or for running ancillary processes or equipment within the facility.

Figure 3:
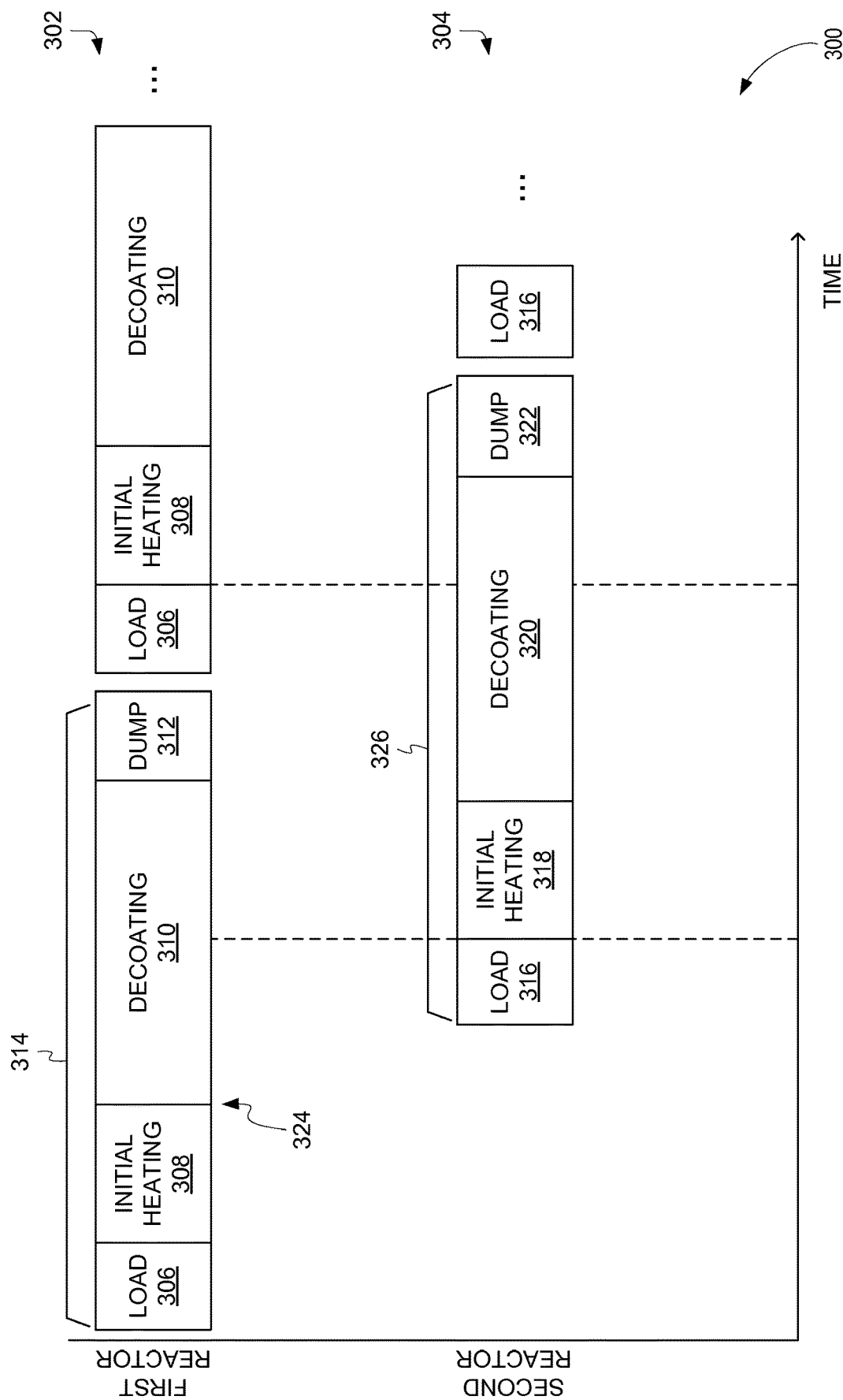
FIG. 3 is a decoating timeline depicting various actions performed during decoating according to certain aspects of the present disclosure.

FIG. 3 is a decoating timeline 300 depicting various actions performed during decoating according to certain aspects of the present disclosure. The decoating timeline 300 includes a first reactor timeline 302 and a second reactor timeline 304. It will be understood that additional reactors can be used as described herein, with the timelines of those additional reactors occurring in phase or out of phase with any other reactor.

The first reactor will initially undergo a loading phase 306 wherein material having an organic content is placed within the reactor. During an initial heating phase 308, the material is heated using hot gas provided from an incinerator. The hot gas provided during this first initial heating phase 308 can come from the combustion of purchased fuel. After an activation point 324, the material begins to generate pyrolysis gases, which are fed, through a circulation duct, into the incinerator. During the decoating phase 310, the pyrolysis gases generated in the reactor are circulated into the incinerator to be combusted and used to provide heated gas to the reactor for further decoating of the material. The decoating phase 310 continues until the material is sufficiently decoated, which can be determined through the use of sensors and a controller, as described above. Once the material is sufficiently decoated, the reaction process can be stopped (e.g., by closing a flow control device in the supply duct) and the now-decoated material can be removed from the reactor during a dumping phase 312. The loading phase 306, initial heating phase 308, decoating phase 310, and dumping phase 312 together comprise a decoating iteration 314. The first reactor timeline 302 can include many successive decoating iterations 314, with or without pauses between each.

Similarly, the second reactor timeline 304 can include many successive decoating iterations 326, also with or without pauses between each. The first decoating iteration 326 of the second reactor timeline 304 begins after the first decoating iteration 314 of the first reactor timeline 302 begins. This delay in the start of the decoating iterations 326 results in the initial heating phase 318 of the second reactor occurring during the decoating phase 310 of the first reactor, which can be referred to as the first reactor and second reactor operating out of phase.

Material is placed in the second reactor during a loading phase 316, which can occur any time prior to the initial heating phase 318, such as immediately prior to or simultaneously as the loading phase 306 of the first reactor. During an initial heating phase 318 of the second reactor, pyrolysis gases from the first reactor's decoating phase 310 are combusted in the incinerator shared by the first and second reactors, resulting in heated gases being provided to the second reactor. Thus, the initial heating phase 318 of the second reactor occurs without the need to provide much or any purchased fuel to the incinerator. The second reactor continues through a decoating phase 320 and a dumping phase 322, as described herein with reference to the first reactor. While the second reactor is in a decoating phase 320, the second reactor is generating pyrolysis gases, which are fed into the incinerator and combusted to provide heated air for an initial heating phase 308 of the first reactor.

The decoating iterations 314, 326 are spaced such that the initial heating phase 308, 318 of one reactor occurs during a decoating phase 310, 320 of the other reactor, thus allowing the pyrolysis gases generated during the decoating phase 310, 320 to be combusted in the incinerator, instead of relying in part or whole on purchased gas.

Figure 4:
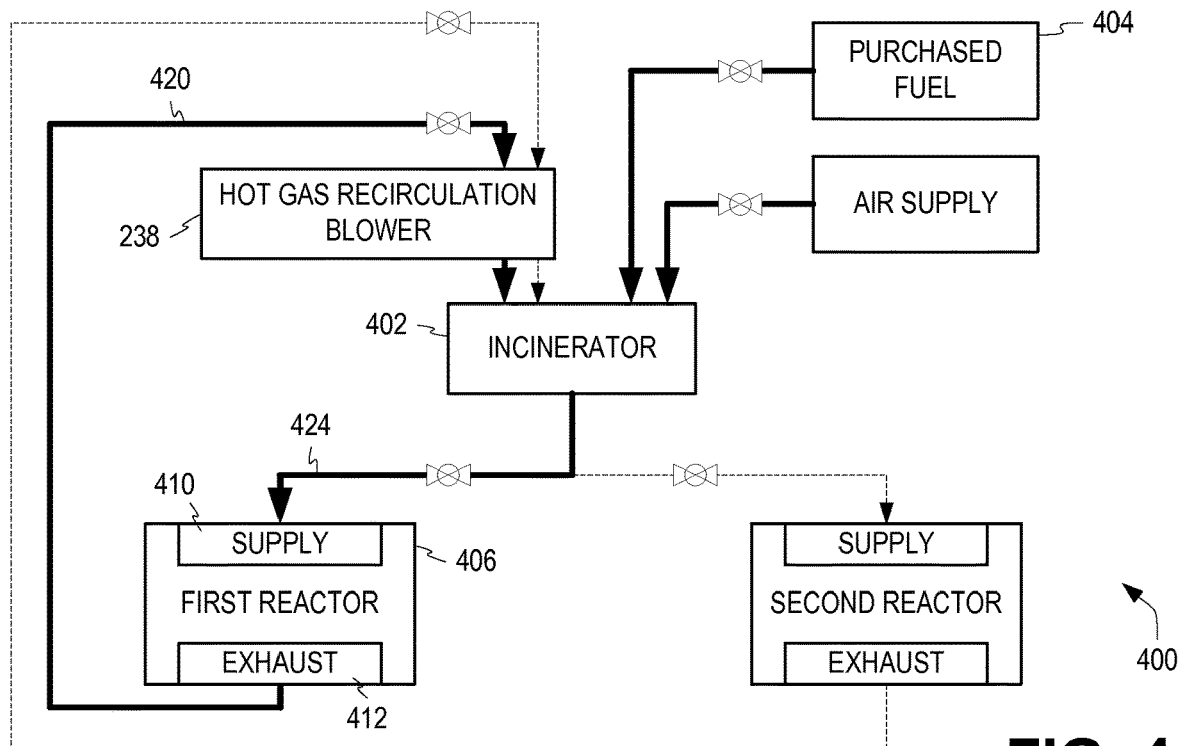
FIG. 4 is a schematic diagram depicting a decoating system during a first initial heating phase, according to certain aspects of the present disclosure.

FIG. 4 is a schematic diagram depicting a decoating system 400 during a first initial heating phase, according to certain aspects of the present disclosure. During the first initial heating phase, purchased fuel 404 is provided to the incinerator 402. The incinerator 402 combusts the purchased fuel 404 and provides heated gas to the supply port 410 of the first reactor 406 through the first supply duct 424. The heated gas heats up material in the first reactor 406. Gas can be circulated through the first circulation duct 420 from the exhaust port 412 of the first reactor 406 to the incinerator 402.

Figure 5:
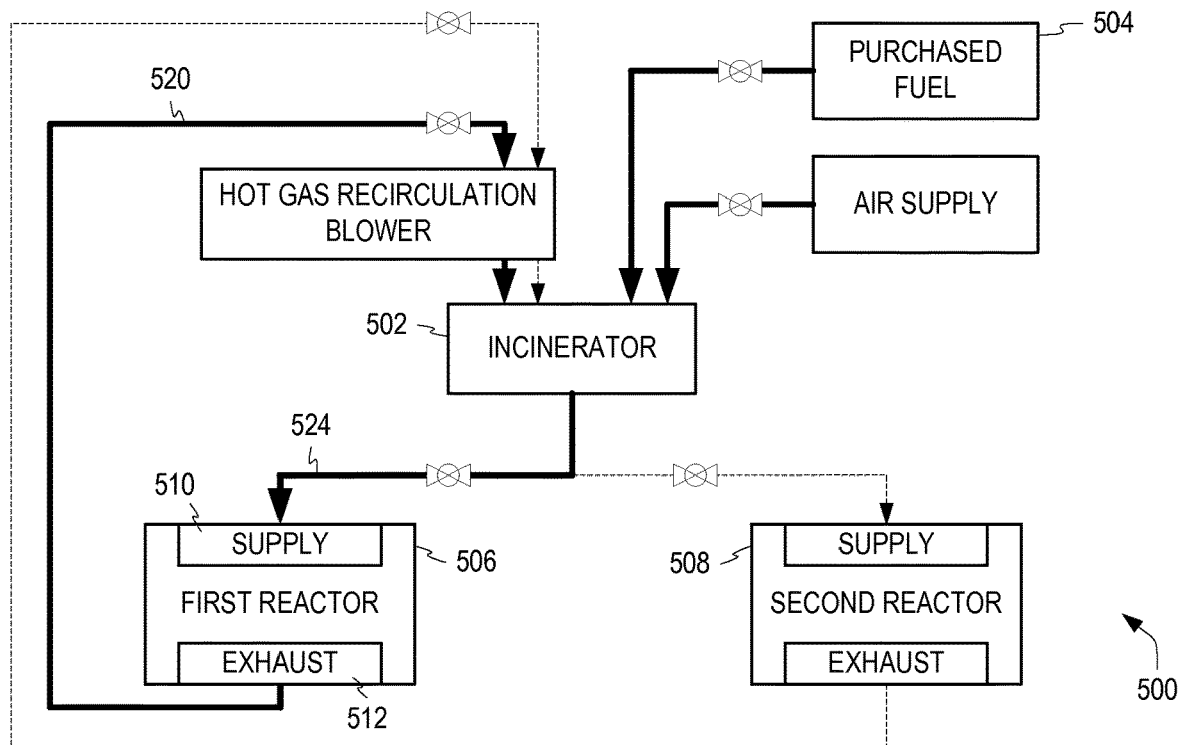
FIG. 5 is a schematic diagram depicting a decoating system (such as, but not limited to the decoating system of FIG. 4) during a first reactor decoating phase, according to certain aspects of the present disclosure.

FIG. 5 is a schematic diagram depicting a decoating system 500 (such as, but not limited to the decoating system 400 of FIG. 4) during a first reactor decoating phase, according to certain aspects of the present disclosure. The first reactor decoating phase can occur after the first initial heating phase or after a combined decoating and initial heating phase. Supply of purchased fuel 504 to the incinerator 502 can be largely reduced or fully stopped. During the first reactor decoating phase, pyrolysis gases are released by the material in the first reactor 506 and provided to the incinerator 502 through the exhaust port 512 and the first circulation duct 520. The pyrolysis gases are combusted in the incinerator 502 and used to provide additional heated gas, through the first supply duct 524 and supply port 510, to the first reactor 506. During this phase, the second reactor 508 can be unloaded, if necessary (e.g., when the first reactor decoating phase occurs after a combined decoating and initial heating phase), loaded, and prepared for decoating.

Figure 6:
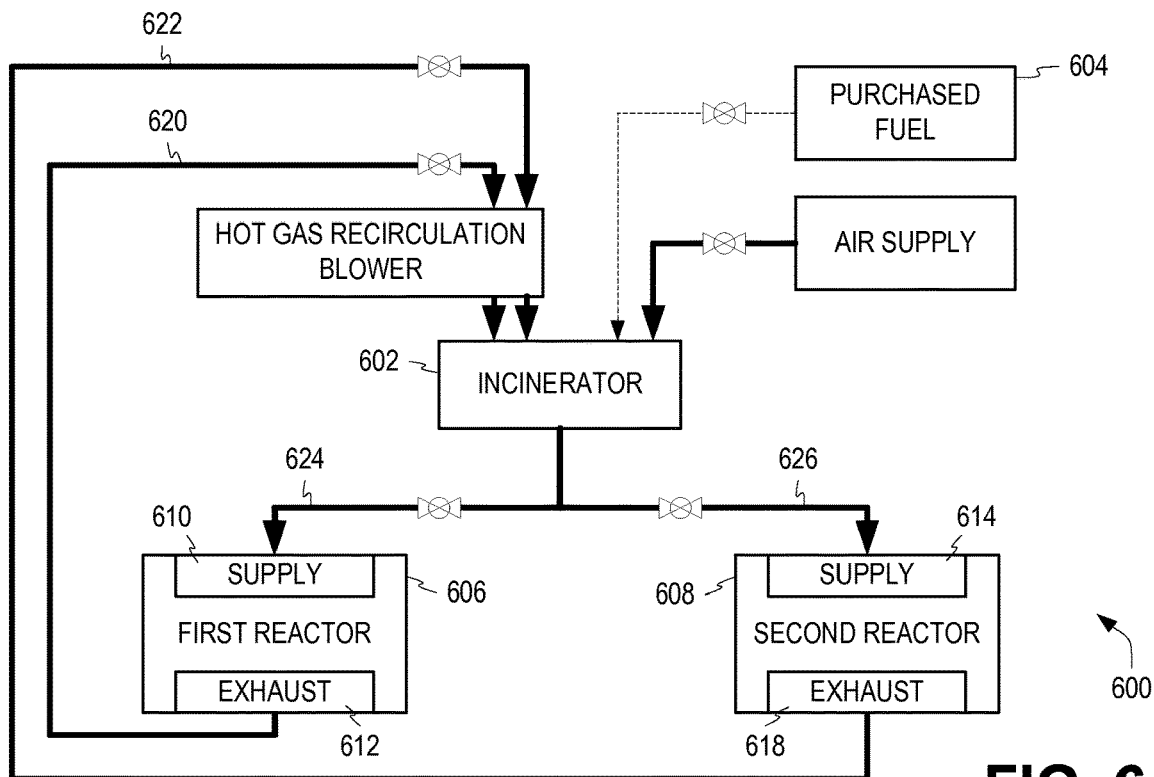
FIG. 6 is a schematic diagram depicting a decoating system (such as, but not limited to the decoating system of FIG. 4) during a combined decoating and initial heating phase, according to certain aspects of the present disclosure.

FIG. 6 is a schematic diagram depicting a decoating system 600 (such as, but not limited to the decoating system 400 of FIG. 4) during a combined decoating and initial heating phase, according to certain aspects of the present disclosure. The combined decoating and initial heating phase can occur after either the first reactor decoating phase or the second reactor decoating phase. Supply of purchased fuel 604 to the incinerator 602 can remain largely reduced or fully stopped.

When occurring after the first reactor decoating phase, the combined decoating and initial heating phase includes continued decoating of material in the first reactor 606 and initial heating of material in the second reactor 608. The incinerator 602 can provide heated gas to the first reactor 606 through the supply duct 624 and supply port 610. The heated gas can continue to decoat the material in the first reactor 606, resulting in the generation of pyrolysis gases, which are output from the exhaust port 612, through the first circulation duct 620, to the incinerator 602. The incinerator 602 can combust these pyrolysis gases to provide heated gas. The incinerator 602 can provide heated gas to the second reactor 608 through the supply duct 626 and supply port 614. The heated gas can heat up the material in the second reactor 608 and initiate a decoating phase in the second reactor. Gas can be circulated out of the exhaust port 618 and through second circulation duct 622 to the incinerator 602.

When occurring after the second reactor decoating phase, the combined decoating and initial heating phase includes continued decoating of material in the second reactor 608 and initial heating of material in the first reactor 606. The incinerator 602 can provide heated gas to the second reactor 608 through the supply duct 626 and supply port 614. The heated gas can continue to decoat the material in the second reactor 608, resulting in the generation of pyrolysis gases, which are output from the exhaust port 618, through the second circulation duct 622, to the incinerator 602. The incinerator 602 can combust these pyrolysis gases to provide heated gas. The incinerator 602 can provide heated gas to the first reactor 606 through the supply duct 624 and supply port 610. The heated gas can heat up the material in the first reactor 606 and initiate a decoating phase in the first reactor. Gas can be circulated out of the exhaust port 612 and through first circulation duct 620 to the incinerator 602.

Figure 7:
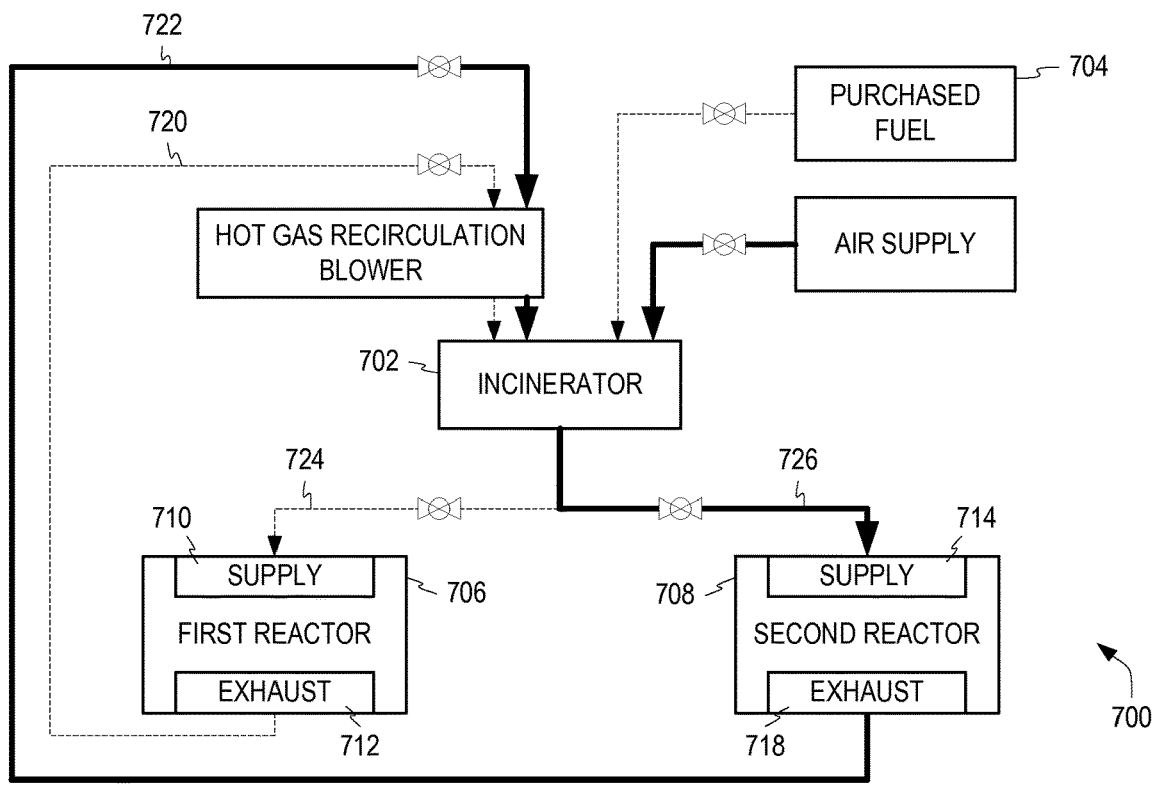
FIG. 7 is a schematic diagram depicting a decoating system (such as, but not limited to the decoating system of FIG. 4) during a second reactor decoating phase according to certain aspects of the present disclosure.

FIG. 7 is a schematic diagram depicting a decoating system 700 (such as, but not limited to the decoating system 400 of FIG. 4) during a second reactor decoating phase according to certain aspects of the present disclosure. The second reactor decoating phase can occur after the combined decoating and initial heating phase. Supply of purchased fuel 704 to the incinerator 702 can be largely reduced or fully stopped. During the second reactor decoating phase, pyrolysis gases are released by the material in the second reactor 708 and provided to the incinerator 702 through the exhaust port 718 and the second circulation duct 722. The pyrolysis gases are combusted in the incinerator 702 and used to provide additional heated gas, through the second supply duct 726 and supply port 714, to the second reactor 708. During this phase, the first reactor 706 can be unloaded, if necessary, loaded, and prepared for decoating (e.g., absent flow relative to the first reactor 706 through supply duct 724, supply port 710, exhaust port 712, and first circulation duct 720).

Figure 8:
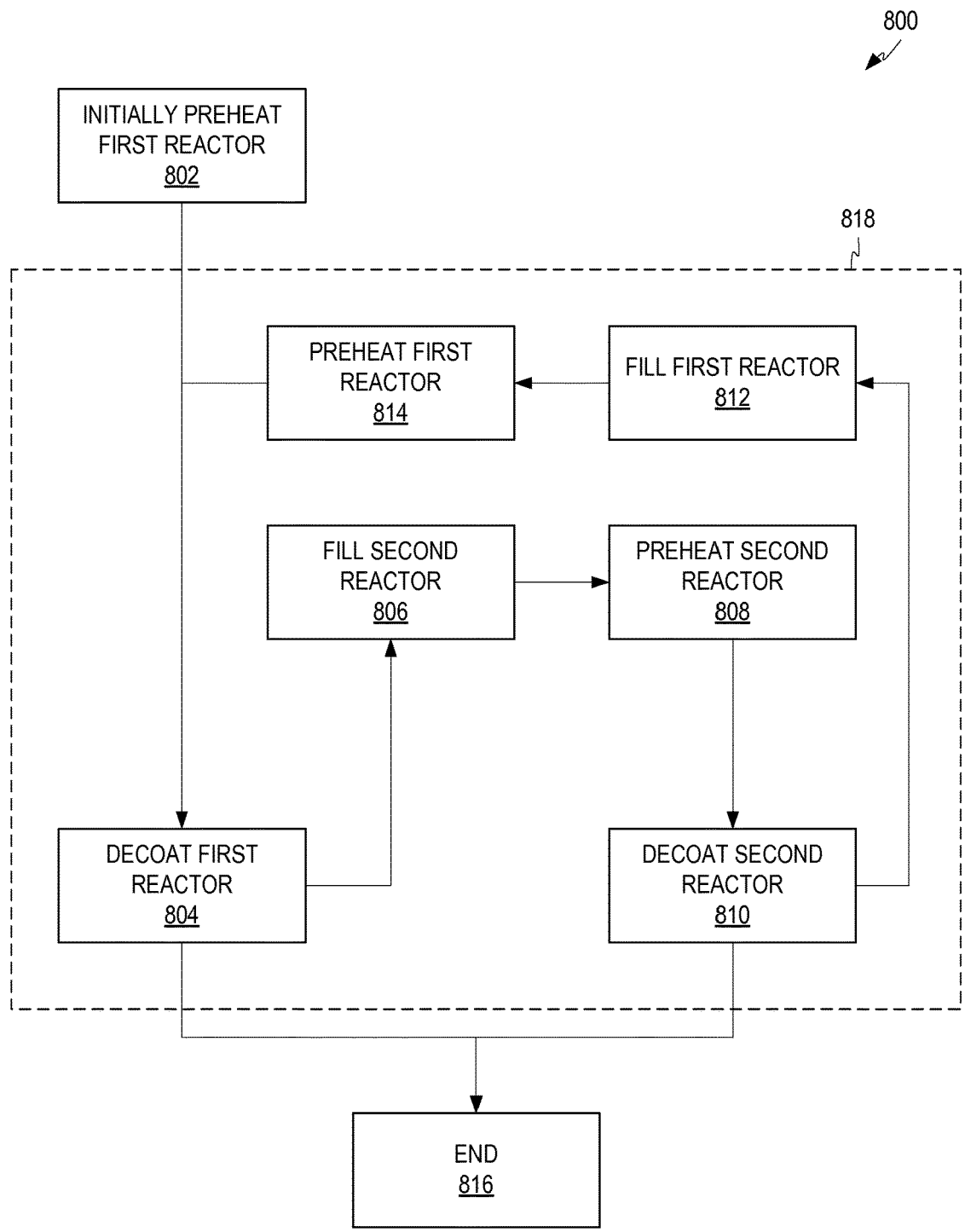
FIG. 8 is a flowchart depicting a self-sustaining decoating process according to certain aspects of the present disclosure.

FIG. 8 is a flowchart depicting a self-sustaining decoating process 800 according to certain aspects of the present disclosure. The self-sustaining decoating process 800 can begin at block 802 by initially preheating the first reactor using purchased fuel (e.g., by combusting purchased fuel in an incinerator). After the first reactor is sufficiently heated to the activation point, pyrolysis gases begin to be generated and the material in the first reactor is decoated at block 804. If not already filled, the second reactor can be filled with new material at block 806. If already filled, the second reactor can be emptied and filled with new material at block 806. The pyrolysis gases generated at block 804 can be used by the incinerator to preheat the second reactor at block 808. After the second reactor is sufficiently heated to the activation point, pyrolysis gases begin to be generated and the material in the second reactor is decoated at block 810. The first reactor can be emptied and filled with new material at block 812. The pyrolysis gases generated at block 810 can be used by the incinerator to preheat new material in the first reactor block at block 814, which can lead to decoating in block 804. The decoating loop 818 can continue as required, with little or no use of purchased fuel (e.g., fuel from sources other than pyrolysis gases created during the decoating process). After any decoating, such as that at block 804 or block 810, the process can end at block 816 (e.g., by not refilling the next reactor).

In some cases, the entire process can be automated. In other cases, any combination of one or more of the actions performed in the self-sustaining decoating process 800 can be performed manually. In some cases, sensors can be used to further automate the process.

The aspects described with reference to FIGS. 1-7 can be used with control systems and/or mechanisms designed to maintain the conditions of the scrap metal decoating system within specified ranges as required by the type of scrap metal being processed, the type of coatings to be removed, and/or the desired throughput or mass flow rates of the decoating systems. In certain cases, the control systems may feature feedback loops, predictive models, and/or other control strategies to determine how one or more control devices may be used to influence the conditions of the decoating system and maintain the desired process parameters or conditions during operation. In some cases, the control system may influence the operation of the decoating system as a whole, or it may influence the operation of one or more of the components of the decoating system individually.

For example, the scrap metal decoating system may incorporate direct or indirect sensing of the temperature of one or more of the reactors (e.g., drum batch reactor 100). Temperature measurements may be made directly, such as but not limited to, with a thermistor, thermocouple, or other temperature sensor, or they may be made indirectly as with measurements of heat source output, modeling, or other methods for inferring or indirectly determining the temperatures of the reactor. The temperature measurement may then be converted into a signal and delivered or otherwise transmitted to a control system and/or temperature control device. The temperature control device may then be used to increase or decrease the temperature in one or more of the reactors. In some cases, the temperature control device may include one or more of a source of hot gases, a source of cold gases, a venting mechanism, an external burner, an integrated burner, an external heat source, or an integrated heat source to raise, lower, or maintain the temperature within one or more of the reactors. In certain cases, the temperature control devices may include one or more of the components of the decoating system, such as a duct, an incinerator, a fan or blower, a heat exchanger, or other component. In other cases, the temperature control devices may be separate equipment that would not otherwise be included in the decoating system.

Similarly, the decoating system may have a system for adjusting and/or maintaining atmospheric conditions within the reactors. The chemical composition and/or pressure within the reactors may be directly measured, as with sensors, or indirectly measured through the use of mathematical models or other inferential measurement techniques. These measured or inferred values may then be converted into a signal and transmitted or otherwise delivered to a control system or atmosphere control device. The atmosphere control device may then be used to alter the chemical composition and/or pressure of the gases within the reactors. For example, in certain cases the atmosphere control device may include one or more of a valve body, pressurized or unpressurized gas reservoirs to introduce gases into the reactors, ducting systems for directing gas flows, a venting system, and/or control mechanisms that alter the air-to-fuel ratio of a combustion-based heating system (e.g., incinerator) to influence the composition of heated combustion gases. In some cases, the atmosphere control devices may include one or more of the components of the decoating system, such as ducts, the incinerator, or other components which may be used to influence the gas flows or exchanges between reactors and/or the exchange of gases within components of the decoating system and the ambient air. The control system may maintain desired levels of oxygen, inert gases, combustion products, vaporized contaminants, water vapor, organics, or other chemical components and their relative or combined pressures. These devices may work alone or in combination with other control equipment. In certain cases, a system of valves may be used to control and adjust gas flows between any component of the scrap metal decoating system.

The foregoing description of the embodiments, including illustrated embodiments, has been presented only for the purpose of illustration and description and is not intended to be exhaustive or limiting to the precise forms disclosed. Numerous modifications, adaptations and uses thereof will be apparent to those skilled in the art.

As used below, any reference to a series of examples is to be understood as a reference to each of those examples disjunctively (e.g., "Examples 1-4" is to be understood as "Examples 1, 2, 3, or 4").

Example 1 is a method comprising loading first material into a first reactor, loading second material into a second reactor, heating the first material in the first reactor until first pyrolysis gases are released, circulating the first pyrolysis gases into an incinerator, combusting the first pyrolysis gases to generate heated gas, and heating the second material in the second reactor using the heated gas until second pyrolysis gases are released.

Example 2 is the method of example 1, wherein heating the first material in the first reactor includes providing purchased fuel to the incinerator and combusting the purchased fuel in the incinerator.

Example 3 is the method of example 2, also including sensing the first pyrolysis gases and ceasing to provide the purchased fuel to the incinerator in response to sensing the first pyrolysis gases.

Example 4 is a method of examples 2 or 3 wherein heating the second material is performed without combusting the purchased fuel.

Example 5 is a method of examples 1-4, further comprising dumping the first material from the first reactor; loading third material into the first reactor; circulating the second pyrolysis gases into the incinerator; combusting the second pyrolysis gases to generate additional heated gas; and heating the third material in the first reactor using the additional heated gas, wherein heating the third material in the first reactor includes heating the third material until third pyrolysis gases are released.

Example 6 is a method comprising providing a first reactor and a second reactor coupled to an incinerator, and performing decoating iterations using the first reactor and the second reactor, wherein the decoating iterations performed using the first reactor are performed out of phase with respect to the decoating iterations performed using the second reactor, and wherein performing each of the decoating iterations includes generating pyrolysis gases and providing the pyrolysis gases to the incinerator.

Example 7 is the method of example 6, wherein performing at least one of the decoating iterations further includes heating a material by combusting the pyrolysis gases in the incinerator.

Example 8 is the method of examples 6 or 7, wherein performing a first one of the decoating iterations further includes providing purchased fuel to the incinerator; and heating a material by combusting the purchased fuel in the incinerator.

Example 9 is the method of example 8, wherein performing a first one of the decoating iterations further includes sensing the pyrolysis gases and ceasing to provide the purchased fuel to the incinerator in response to sensing the pyrolysis gases.

Example 10 is the method of examples 8 or 9 further comprising combusting the pyrolysis gases in the incinerator to generate heated gas during the first one of the decoating iterations, and wherein performing a second one of the decoating iterations includes heating additional material using the heated gas.

Example 11 is a system comprising an incinerator for generating heated gas, a first decoating reactor having a first supply port and a first exhaust port, wherein the first supply port is coupled to the incinerator for receiving heated gas from the incinerator and the first exhaust port is coupled to the incinerator for providing first pyrolysis gas to the incinerator, and a second decoating reactor having a second supply port and a second exhaust port, wherein the second supply port is coupled to the incinerator for receiving heated gas from the incinerator and the second exhaust port is coupled to the incinerator for providing second pyrolysis gas to the incinerator.

Example 12 is the system of example 11 wherein the incinerator is coupled to the first exhaust port and the second exhaust port for combusting the first pyrolysis gas and second pyrolysis gas, respectively.

Example 13 is the system of examples 11 or 12 wherein the first exhaust port, the incinerator, and the second supply port form a first pathway configured to provide the heated gas to the second decoating reactor when the first pyrolysis gas generated in the first decoating reactor is provided to the incinerator.

Example 14 is the system of example 13 wherein the second exhaust port, the incinerator, and the first supply port form a second pathway configured to provide the heated gas to the first decoating reactor when the second pyrolysis gas generated in the second decoating reactor is provided to the incinerator.

Example 15 is the system of example 13 wherein the second exhaust port, the incinerator, and a third supply port of a third decoating reactor form a second pathway configured to provide the heated gas to the third decoating reactor when the second pyrolysis gas generated in the second decoating reactor is provided to the incinerator.

Example 16 is the system of examples 11-15, further comprising one or more flow control devices coupled between the incinerator and at least one of the first supply port and the second supply port for directing the heated gas to one or both of the first decoating reactor and the second decoating reactor.

Example 17 is the system of example 16, further comprising a controller coupled to the one or more flow control devices for time-offsetting a first decoating process in the first decoating reactor from a second decoating process in the second decoating reactor.

Example 18 is the system of examples 11-17, further comprising a source of purchased fuel coupled to the incinerator through a flow control device to provide the purchased fuel to the incinerator, wherein the flow control device is actuatable to cease providing purchased fuel to the incinerator when first pyrolysis gas or second pyrolysis gas is provided to the incinerator.

Example 19 is the system of examples 11-16 or 18, further comprising a first sensor positioned to sense the presence of the first pyrolysis gas, a second sensor positioned to sense the presence of the second pyrolysis gas, and a controller coupled to the first sensor, the second sensor, and one or more flow control devices for directing the heated gas to one of the first decoating reactor and the second decoating reactor in response to sensing the presence of the first pyrolysis gas or the second pyrolysis gas in the other of the first decoating reactor and the second decoating reactor.

Example 20 is the system of example 19, further comprising an additional flow control device coupling a fuel source to the incinerator, wherein the controller is further coupled to the additional flow control device to close the additional flow control device in response to sensing the presence of the first pyrolysis gas.

What is claimed is:

1. A system, comprising:
an incinerator for generating heated gas;
a first decoating reactor having a first supply port and a first exhaust port, wherein the first supply port is coupled to the incinerator for receiving heated gas from the incinerator and the first exhaust port is coupled to the incinerator for providing first pyrolysis gas to the incinerator;
a second decoating reactor having a second supply port and a second exhaust port, wherein the second supply port is coupled to the incinerator for receiving heated gas from the incinerator and the second exhaust port is coupled to the incinerator for providing second pyrolysis gas to the incinerator;
a first sensor positioned to sense the presence of the first pyrolysis gas;
a second sensor positioned to sense the presence of the second pyrolysis gas; and a controller configured to receive input from the first sensor and the second sensor and to control one or more flow control devices for:
  directing the heated gas from the incinerator to the first decoating reactor in response to sensing by the second sensor; and
  directing the heated gas from the incinerator to the second decoating reactor in response to sensing by the first sensor.

2. The system of claim 1, wherein the incinerator is arranged to receive the first pyrolysis gas from the first exhaust port and receive second pyrolysis gas from the second exhaust port for combusting the first pyrolysis gas and second pyrolysis gas, respectively.

3. The system of claim 1, wherein the first exhaust port, the incinerator, and the second supply port form a first pathway configured to provide the heated gas to the second decoating reactor when the first pyrolysis gas generated in the first decoating reactor is provided to the incinerator.

4. The system of claim 3, wherein the second exhaust port, the incinerator, and the first supply port form a second pathway configured to provide the heated gas to the first decoating reactor when the second pyrolysis gas generated in the second decoating reactor is provided to the incinerator.

5. The system of claim 1, further comprising one or more flow control devices coupled between the incinerator and at least one of the first supply port and the second supply port for directing the heated gas to one or both of the first decoating reactor and the second decoating reactor.

6. The system of claim 5, further comprising a controller configured to control the one or more flow control devices for time-offsetting a first decoating process in the first decoating reactor from a second decoating process in the second decoating reactor.

7. The system of claim 1, further comprising:
  a source of purchased fuel coupled to the incinerator through a flow control device to provide the purchased fuel to the incinerator, wherein the flow control device is actuatable to cease providing purchased fuel to the incinerator when first pyrolysis gas or second pyrolysis gas is provided to the incinerator.

8. The system of claim 1, further comprising an additional flow control device coupling a fuel source to the incinerator, wherein the controller is further coupled to the additional flow control device to close the additional flow control device in response to sensing the presence of the first pyrolysis gas.

9. A method using the system of claim 1, comprising:
  loading first material into the first decoating reactor;
  loading second material into the second decoating reactor;
  heating the first material in the first decoating reactor until first pyrolysis gases are released;
  circulating the first pyrolysis gases into the incinerator;
  combusting the first pyrolysis gases to generate heated gas; and
  heating the second material in the second decoating reactor using the heated gas until second pyrolysis gases are released.

10. The method of claim 9, wherein heating the first material in the first decoating reactor includes:
  providing purchased fuel to the incinerator; and
  combusting the purchased fuel in the incinerator.

11. The method of claim 10, further comprising:
  sensing the first pyrolysis gases; and
  ceasing to provide the purchased fuel to the incinerator in response to sensing the first pyrolysis gases.

12. The method of claim 10, wherein heating the second material is performed without combusting the purchased fuel.

13. The method of claim 9, further comprising:
  dumping the first material from the first decoating reactor;
  loading third material into the first decoating reactor;
  circulating the second pyrolysis gases into the incinerator;
  combusting the second pyrolysis gases to generate additional heated gas; and
  heating the third material in the first decoating reactor using the additional heated gas, wherein heating the third material in the first decoating reactor includes heating the third material until third pyrolysis gases are released.

14. A method using the system of claim 1, comprising:
  providing the first decoating reactor and the second decoating reactor coupled to the incinerator; and
  performing decoating iterations using the first decoating reactor and the second decoating reactor, wherein the decoating iterations performed using the first decoating reactor are performed out of phase with respect to the decoating iterations performed using the second decoating reactor, and wherein performing each of the decoating iterations includes:
    generating pyrolysis gases; and
    providing the pyrolysis gases to the incinerator.

15. The method of claim 14, wherein performing at least one of the decoating iterations further includes heating a material by combusting the pyrolysis gases in the incinerator.

16. The method of claim 14, wherein performing a first one of the decoating iterations further includes:
  providing purchased fuel to the incinerator; and
  heating a material by combusting the purchased fuel in the incinerator.

17. The method of claim 16, wherein performing a first one of the decoating iterations further includes:
  sensing the pyrolysis gases; and
  ceasing to provide the purchased fuel to the incinerator in response to sensing the pyrolysis gases.

18. The method of claim 16, further comprising combusting the pyrolysis gases in the incinerator to generate heated gas during the first one of the decoating iterations, and wherein performing a second one of the decoating iterations includes heating additional material using the heated gas.

* * * * *